United States Patent
Campanini

[15] 3,692,366
[45] Sept. 19, 1972

[54] FLUID PRESSURE BRAKE SYSTEM
[72] Inventor: Sergio Campanini, Lincolnwood, Ill.
[73] Assignee: Berg Mfg. & Sales Co., Des Plaines, Ill.
[22] Filed: Jan. 13, 1971
[21] Appl. No.: 106,154

[52] U.S. Cl. ...................................................303/9
[51] Int. Cl. ...............................................B60t 13/22
[58] Field of Search .........................303/7, 9; 188/3

[56] References Cited

UNITED STATES PATENTS

| | | | |
|---|---|---|---|
| 3,073,623 | 1/1963 | Owen | 188/3 R X |
| 3,237,995 | 3/1966 | Dobrikin | 303/9 |

FOREIGN PATENTS OR APPLICATIONS 1,178,646  1/1970  Great Britain..................303/7

*Primary Examiner*—Edward A. Sroka
*Attorney*—Parker, Carter & Markey

[57] ABSTRACT

A tractor-trailer brake system having spring-applied, fluid pressure-released, emergency-parking brake actuators wherein a separate fluid pressure reservoir on the tractor may be communicated to the actuators to release the brakes and a separate tank on the trailer is automatically communicated to the trailer actuators to release the same through electrical means responsive to release of the tractor brake. The separate trailer tank may be communicated manually with the trailer brakes when the tractor and trailer are disconnected.

7 Claims, 3 Drawing Figures

INVENTOR.
Sergio Campanini
BY Parker, Carter & Markey
Attorneys.

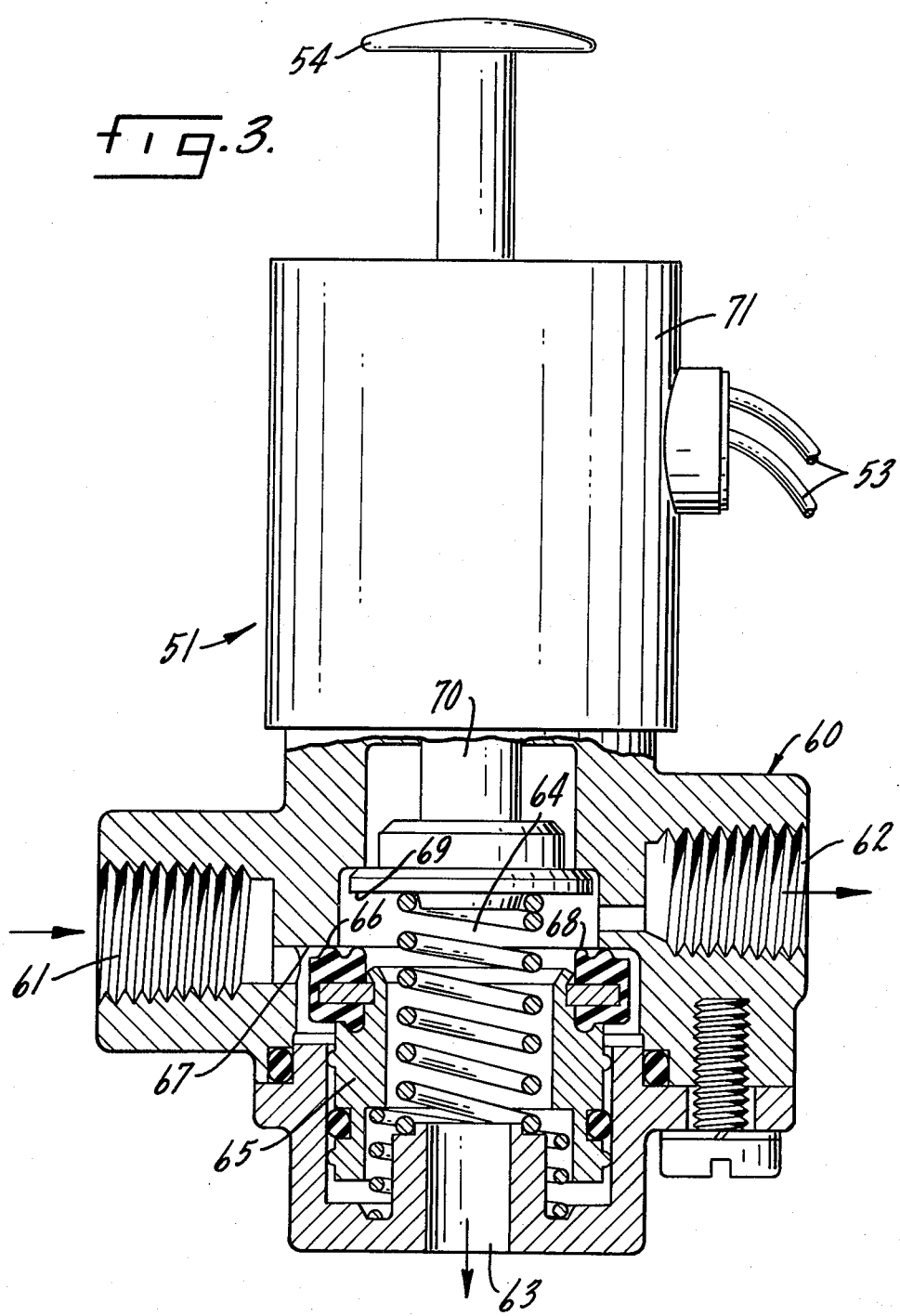

FLUID PRESSURE BRAKE SYSTEM

SUMMARY OF THE INVENTION

This invention relates to fluid pressure brake systems for tractor-trailer vehicles and the like.

One purpose of the invention is to provide means for substantially simultaneously releasing spring-applied trailer brakes in automatic response to manual release of tractor brakes.

Another purpose is to provide means for manually releasing spring-applied trailer brakes when no tractor is connected to the trailer.

Another purpose is to provide a tractor-trailer brake system having alternate means for releasing spring-applied brakes.

Another purpose is to provide a tractor-trailer fluid pressure brake system having a first means for releasing spring-applied brakes and a second, independent means for releasing said brakes.

Other purposes may appear from time to time during the course of the specification and claims.

BRIEF DESCRIPTION OF THE DISCLOSURE

The invention is illustrated more or less diagrammatically in the accompanying drawings, wherein:

FIG. 3 is a view in partial cross section and on an enlarged scale of a valve of the invention.

Like parts are indicated by like numerals throughout the specification and drawings.

DESCRIPTION OF THE PREFERRED EMBODIMENT

Figure 1:
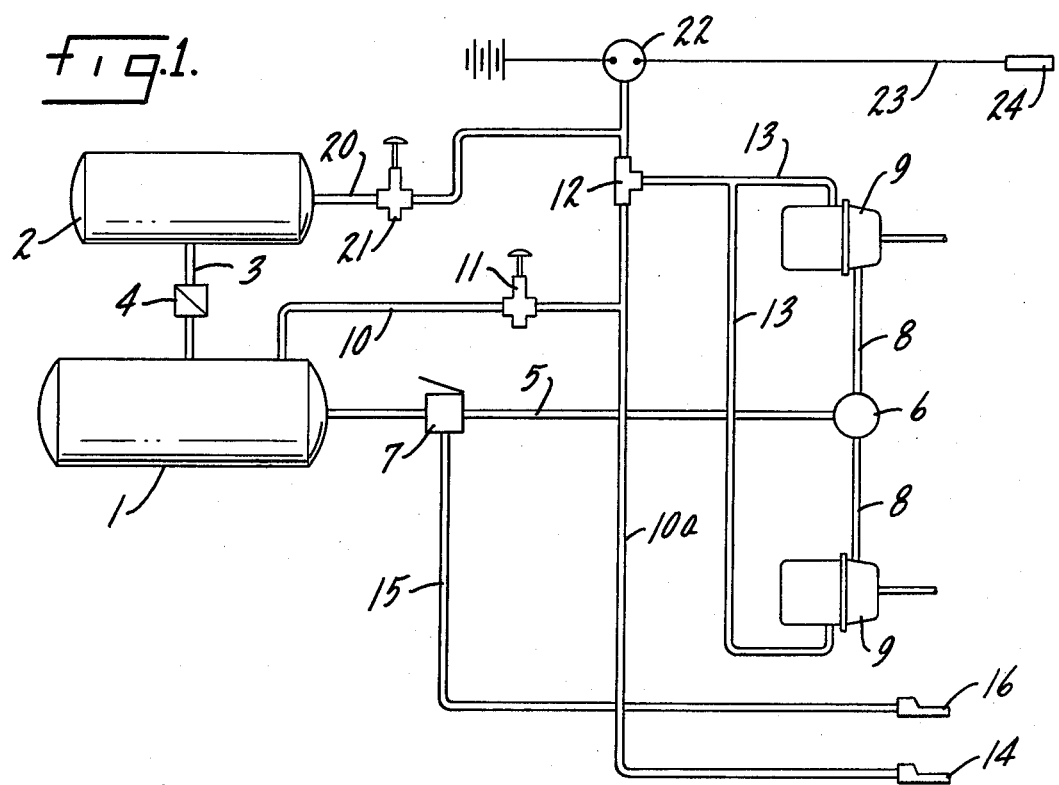
FIG. 1 is a schematic illustration of a tractor brake system of the invention.

Referring now to the drawings, and particularly to FIG. 1, the numeral 1 designates a fluid pressure reservoir or tank. It will be understood that the reservoir 1 may take the form of one or more tanks, the single tank 1 being illustrated for clarity. A separate or "protected" fluid pressure reservoir 2 is supplied with fluid pressure through the conduit 3 from tank 1, the check valve 4 precluding flow of fluid pressure from tank 2 back to tank 1.

A service conduit 5 communicates tank 1 with valve 6 when the foot pedal-operated brake application valve 7 in conduit 5 is actuated by the vehicle operator. Fluid pressure delivered to valve 6 is communicated by conduits 8 with the service side of the tractor brake actuators 9, as is well known in the art. While two actuators are shown in the drawings, the number may vary. In this regard it will be understood that the schematic illustrations in FIGS. 1 and 2 are limited to parts necessary for an understanding of the invention and for clarity.

An emergency fluid pressure conduit 10 communicates tank 1, when manually operable valve 11 is opened, with a two-way check valve 12. Conduit 13 communicates check valve 12 with the emergency sides of actuators 9 to compress the emergency brake-actuating springs therein and thus to hold the spring-applied, brake-actuating elements of actuators 9 in released position. The actuators 9 are of standard, well known construction having service and emergency chambers therein, as shown for example in U.S. Letters Pat. No. 3,131,609. Conduit 10 includes a branch 10a leading to the emergency gladhand connector 14 on the tractor. A service pressure conduit 15 communicates tank 1 with the service gladhand connector 16 when valve 7 is actuated.

A fluid pressure conduit 20 communicates tank 2 with the opposite inlet of two-way check valve 12 when manually operable valve 21 is opened. It will be understood that fluid pressure delivered to either inlet of valve 12 will be delivered through conduit 13 to the emergency chambers of actuators 9 to release the springs therein, superior pressure introduced at either inlet of valve 12 being effective to close the opposite inlet. Conduit 20 also delivers fluid pressure from tank 2, when valve 21 is opened, to a normally open, pneumatically operated switch 22 to close the same and to deliver electrical energy through conductor 23 to connector 24.

Figure 2:
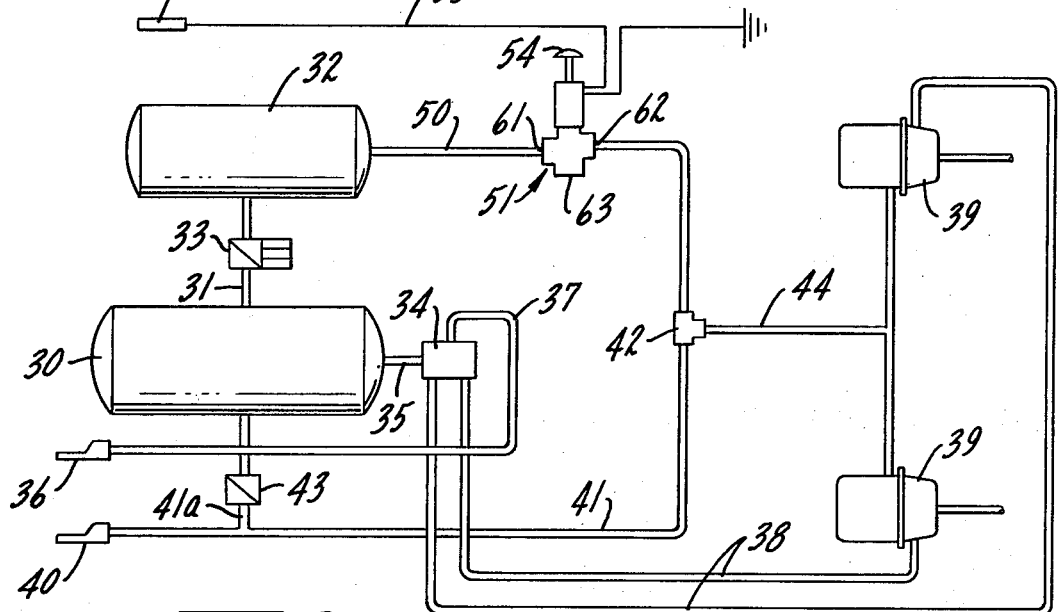
FIG. 2 is a schematic illustration of a trailer brake system of the invention.

Referring now to FIG. 2, a service fluid pressure reservoir or tank 30 provides fluid pressure through conduit 31 to a separate or "protected" tank 32, the check valve 33 precluding redirection of fluid pressure from tank 32 to tank 30. The valve 33 permits a flow only above a predetermined fluid pressure level of, for example, 45 pounds.

Tank 30 also delivers fluid pressure to relay valve 34 of conventional construction, through conduit 35. Service gladhand connector 36 is provided for connection with gladhand 16 and delivers fluid pressure through conduit 37 to valve 34. Conduits 38 deliver fluid pressure from valve 34 to actuators 39, it being understood that actuators 39 correspond to actuators 9 illustrated in FIG. 1.

Emergency gladhand connector 40 is provided for connection with gladhand 14 of the tractor for delivery of fluid pressure through conduit 41 to two-way check valve 42. A branch conduit 41a delivers fluid pressure through one-way check valve 43 to tank 30. Conduit 44 communicates the outlet of two-way check valve 42 with the emergency chambers of actuators 39 to compress and release the springs therein.

A conduit 50 communicates tank 32 with the opposite inlet of check valve 42 when the three-way electropneumatic valve 51 is in one position. A connector 52 is provided on the trailer for connection with connector 24 of the tractor and conductor 53 delivers electrical energy to valve 51 to move the same to said position for delivery of fluid pressure from tank 32 through valve 42 and conduit 44 to the emergency chambers of actuators 39. Valve 51 includes a manually accessible handle element 54 for manual movement of valve 51 into said position when the trailer is disconnected from the tractor.

Referring now to FIG. 3, the valve 51 is shown to include a housing 60 having an inlet 61, an outlet 62 and an exhaust outlet 63. The elements 61, 62, 63 communicate with a valve chamber 64. A valve shuttle 65 has a first valve face 66 yieldingly urged toward a fixed valve seat 67 between inlet 61 and outlet 62 and a second valve face 68 positioned for contact by movable valve face 69 yieldingly urged away from face 68. It will be observed that annular valve faces 66, 68 are formed on a single valve face member of compressible or rubberlike material and lie coaxially in a single plane, the face 68 being of lesser diameter than the face 66.

Movable valve element 69 includes a stem 70 rising, as the parts are shown, into a solenoid chamber 71 with which the conductor 53 is connected, handle 54 extending from chamber 71 for manual movement of stem 70 and the shuttle-operating valve seat element 69.

The use and operation of the invention are as follows:

In normal operation the vehicle operator activates the actuators 9, 39 by means of brake-application valve 7, delivering service fluid pressure to the service chambers of actuators 9, 39 to apply the tractor and trailer brakes. Fluid pressure is normally continuously maintained in the emergency chambers of actuators 9 from tank 1 through normally open valve 11, check valve 12 and conduit 13. Similarly, fluid pressure is normally maintained in the emergency chambers of actuators 39 through conduit 10, connectors 14, 40, conduit 41, valve 42 and conduit 44. Should the vehicle operator wish to employ the springs in actuators 9, 39 to apply the brakes, in an emergency or for parking, the operator moves the valve 11 to its exhaust position, thus withdrawing fluid pressure from the emergency chambers in actuators 9, 39 and freeing the springs therein to apply the brakes. Similarly, in the event of a loss of pressure, the fluid pressure in said emergency chambers would be exhausted, producing an automatic application of emergency brakes by the springs in actuators 9, 39.

With the brakes applied and held in brakes-on position by the springs in actuators 9, 39, situations may occur in which normal fluid pressure is not available for release of said brakes. In the event of an automatic or manual emergency operation, for example, it may be necessary to move the vehicle out of traffic before the loss of normal pressure can be rectified. In such event, the operator is provided with protected tank 2, not effected by such loss of normal pressure, and the valve 21. Operation of valve 21 delivers fluid pressure from tank 2 through two-way check valve 12 and conduit 13 to the emergency chambers of actuators 9 to retract the springs therein and free the tractor brakes for vehicle operation. Substantially simultaneously, in response to fluid pressure in conduit 20, switch 22 is closed to deliver electrical energy through conductor 23, connectors 24, 52 and conductor 53 to actuate valve 51. Delivery of electrical energy to the solenoid or electrically operated element 71 produces a downward movement, as the parts are shown, of valve-actuating face 69 to close the exhaust port 63 and to move valve seat 66 off its seat, thus communicating inlet 61 with outlet 62 and delivering fluid pressure from trailer protected tank 32 through conduit 50, valve 42 and conduit 44 to the emergency chambers of actuators 39 to release the spring-applied brakes of the trailer.

Should the operator thereafter wish to again utilize the springs of actuators 9, 39 to apply the brakes, it is only necessary that the operator move valve 21 to its exhaust position. Thereupon the switch 22 will open, electrical energy will be no longer available to valve 51, and the spring engaging face 69 will move the same to the position shown in FIG. 3, thus exhausting the spring chambers of actuators 39 and closing inlet 61 against loss of fluid pressure from tank 32.

When the trailer is disconnected from a tractor, as for example when the trailer is in a yard, the springs of actuators 39 will be in brakes-on or parked position. Should the operator wish to move the trailer, without fully connecting a tractor, handle 54 may be manually operated to open valve 51 and to supply pressure from tank 32 to actuators 39 to release the springs therein, as above described. When the trailer has been repositioned and the operator wishes to again apply the parking brakes, the handle 54 is simply released out to return the valve 51 to the position shown, for example, in FIG. 3.

While valve 51 is shown as alternatively operable by manual and electrical means and a suitable detent (not shown) could be provided to hold handle 54 in its inward position, it will be understood that valve 51 could be solely an electrically operated valve and a separate, solely manually operated valve, with associated conduits communicating it with tank 32 and valve 42, could be provided without departing from the nature and scope of the invention.

The embodiments of the invention in which an exclusive property or privilege is claimed are defined as follows:

1. In a tractor-trailer fluid pressure brake system, a first fluid pressure reservoir on the tractor, a second fluid pressure reservoir on the tractor, means delivering fluid pressure from said first to said second reservoir and precluding delivery of fluid pressure from said second to said first reservoir, spring-applied, fluid pressure released brake actuators on said tractor, a conduit communicating said second reservoir with said actuators, a manually operable valve controlling said communication, a fluid pressure-actuated electrical switch on said tractor and connected to said conduit for simultaneous delivery of fluid pressure to said actuators and said switch, an electrical conductor connected to said switch, a third fluid pressure reservoir mounted on said trailer, a fourth fluid pressure reservoir mounted on said trailer, means delivering fluid pressure from said third to said fourth fluid pressure reservoir and precluding delivery of fluid pressure from said fourth to said third reservoir, spring-applied, fluid pressure brake actuators on said trailer, a conduit communicating said fourth reservoir with said trailer actuators, an electrically operated valve controlling said last-named communication, said conductor being connected to said last-named valve, said last-named valve being movable into a first position communicating said fourth reservoir with said trailer actuators in response to delivery of fluid pressure to said switch and automatically yieldably urged into a second position exhausting said trailer actuators to atmosphere in the absence of electrical energy delivered by said conductor.

2. The structure of claim 1, characterized by and including means for manually moving said last-named valve into said first position.

3. A tractor-trailer vehicle brake system including spring-applied, fluid pressure released brake actuators on the tractor and on the trailer, a first pair of fluid pressure reservoirs on the tractor, a second pair of fluid pressure reservoirs on the trailer and valve and conduit means selectably, alternately connecting one of said first reservoirs with said tractor actuators and one of said second reservoirs with said trailer actuators.

4. The structure of claim 3, wherein a tractor-mounted, manuallysoperable valve connects one of said reservoirs on said tractor with said actuators on said tractor and simultaneously operates a switch electrically connected to an electrically operable valve on said trailer, said electrically operated valve controlling communication between one of said reservoirs on said trailer with said actuators on said trailer.

5. In a tractor-trailer vehicle brake system, spring-applied fluid pressure-released brake actuators on the tractor and on the trailer, first and second fluid pressure sources on the tractor and on the trailer, first valve and conduit means communicating said first sources with their associated actuators, second valve and conduit means communicating said second sources with their associated actuators, said second valve on the trailer being automatically opened to communicate the second trailer source with the trailer actuators in response to manual opening of the second valve on the tractor to communicate the second tractor source with the tractor actuators.

6. The structure of claim 5, characterized by and including manually operable means communicating said second trailer source with the trailer actuators independently of the tractor.

7. The The structure of claim 5, characterized by and including manually operable means for opening said second valve on the trailer.

* * * * *